March 25, 1969     T. F. LONGWELL     3,435,157

SEMICONDUCTOR TRANSDUCER ASSEMBLY

Filed Aug. 23, 1965

INVENTOR
THOMAS F. LONGWELL
BY
ATTY.

United States Patent Office 3,435,157
Patented Mar. 25, 1969

3,435,157
SEMICONDUCTOR TRANSDUCER ASSEMBLY
Thomas F. Longwell, Mount Prospect, Ill., assignor to Automatic Electric Laboratories, Inc., Northlake, Ill., a corporation of Delaware
Filed Aug. 23, 1965, Ser. No. 481,752
Int. Cl. H04r 17/00
U.S. Cl. 179—110                                    1 Claim

ABSTRACT OF THE DISCLOSURE

A semiconductor microphone assembly includes a hollow case with two open ends, having a diaphragm, carrying a semiconductor, mounted over one open end, and a cover, having one end of a stylus rigidly attached thereto, mounted over the other open end. The stylus extends into the case so that its tip bears against a stress-sensitive surface of the semiconductor. The stress on the semiconductor surface is varied in response to actuation of the diaphragm. The cover, in which the stylus is mounted, is of a transparent material to permit the viewing, through a microscope, of the stylus and the semiconductor during assembly.

---

This invention relates to semiconductor transducers and particularly to a telephone transmitter employing a semiconductor transducer.

The operation of a semiconductor transducer is based on the effects of stresses applied to the junction between two regions of semiconductor material of opposite conductivity-type, i.e., a p-n junction. These effects have been known for some time and considerable discussion of them exists in the literature, e.g., the paper by W. Ridner and I. Braun, "Resistance of Elastically Deformed Shallow P–N Junctions: II," Journal of Applied Physics, vol. 34, pp. 1958–70 (July 1963). In addition, U.S. Patent 2,632,062, issued to H. C. Montgomery on March 17, 1953, discloses a semiconductor transducer which employs these effects.

All of the prior art references which disclose the use of a diaphragm and stylus to apply a varying mechanical stress to a p-n junction show the stylus attached to the diaphragm and the semiconductor body mounted to a fixed support. If the semiconductor body is a transistor of the planar type, the stress is applied to the emitter-base junction by applying pressure to the stylus which is in contact with the small emitter area on the surface of the transistor. The width of the emitter area on the surface of a high frequency transistor is approximately 0.001 inch, and the tip of the stylus should be maintained in contact with the emitter area to a tolerance of 0.0001 inch. Because of the dimensions involved, it is necessary to locate the emitter area by viewing the surface of the transistor with a high power microscope and to position the stylus accurately while continuing to view the surface through the microscope.

With the stylus mounted on the diaphragm and the transistor mounted on a fixed support, as in prior art assemblies, the diaphragm, with its large diameter for good acoustical coupling, and the stylus, with its short length for a compact assembly, combine to make it difficult to view the transistor surface adequately. The angle of viewing is large, making it impossible to focus on the whole surface of the transistor, and the distance away from the surface that the objective lens must be placed is incompatible with the focal length of a high power microscope.

Therefore, it is the object of this invention to provide an improved semiconductor transducer assembly which eliminates the difficulties involved in the fabrication thereof.

This invention features a semiconductor transducer assembly in which the transistor is mounted on the diaphragm and the stylus is mounted to a fixed support after being properly positioned. Positioning and mounting of the stylus is accomplished by viewing the surface of the transistor through a transparent cover on the back of the case and positioning the stylus after extending it through a hole in the cover. A bias force is applied to the stylus to place a bias stress on the emitter base junction and then an epoxy material is introduced into the hole and allowed to harden while the position of the stylus and the bias force is maintained.

Other objects and features of this invention, and a clear understanding thereof, will be gained from a consideration of the following detailed description in conjunction with the drawing in which.

Figure 1:
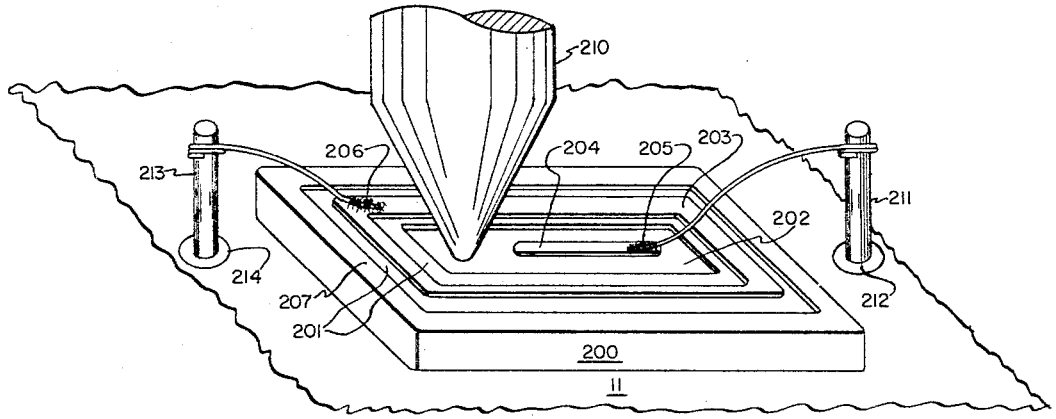
FIG. 1 is an isometric view of the surface of a planar transistor and the tip of a stylus contacting the emitter region.

FIG. 1 shows a transistor 200 mounted on the top 11 of a header, and a stylus 210 contacting the transistor at the emitter region 202. The transistor 200 is a defused-emitter-base transistor of the planar type. A description of the process of making this type of transistor is discussed on page 23 of Phillips, Transistor Engineering, McGraw-Hill (New York, 1962). The emitter region 202 is centrally located on the surface of the transistor 200. The base region 201 surrounds the emitter region 202 so that the base region extends completely under the emitter region. The main portion of the emitter-base junction is in a plane slightly below the surface of the transistor but the junction rises to the surface at the interface between the areas 201 and 202. The collector region 207 is comprised of the whole bottom portion of the transistor 200 and the area on the surface outside of the area 201. The emitter lead 205 is attached to the emitter contact 204 on the emitter region 202 and to the post 211, which is mounted on the header but insulated from it by the glass 212. The base lead 206 extends from the base contact 203, which is shown as a rectangular area on the base region 201, to the post 213 which is mounted to the header but insulated from it by the glass 214. The collector contact on the underside of the transistor 200 is in direct electrical and mechanical contact with the top 11 of the header on which the transistor 200 is mounted. As is shown the stylus 210 contacts a small area of the surface of the transistor in the emitter region 202. Pressure applied to the stylus 210 would be transmitted through the thin emitter layer with a resulting stress on the emitter-base junction which lies just beneath the surface. The stylus 210 should be positioned accurately to contact the surface of the transistor some place on the emitter region 202 other than the emitter contact area 204.

Figure 2:
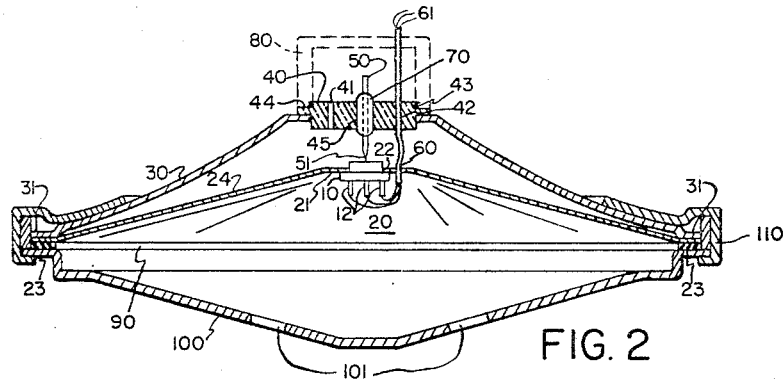
FIG. 2 is a sectioned elevational view of a telephone transmitter assembly embodying the invention.

FIG. 2 shows an assembled telephone transmitter unit in which the transistor header 10 is mounted in a hole 22 in the flat portion 21 of the diaphragm 20. The transistor, which is too small to be shown in this drawing, is located on the top 11 of the transistor header 10. The diaphragm 20 has sloping sides 24 and the edge 23 of the diaphragm 20 is mounted to the edge 31 of the case or housing 30 so that the diaphragm 20 is mounted in one of the open ends of the case 30. The gasket 90 and the cover 100 with holes 101 therein to permit the passage of sound waves are mounted over the diaphragm 20 and case 30 and secured by the clip 110 which surrounds the whole unit. The transparent cover 40 is mounted over the other open end of the case 30. This mounting can be accomplished by cementing the cover 40 to the case 30 at the outer rim 44 with an epoxy material. The hole 41 in the cover 40 permits an equalization of the atmospheric pressure on both sides of the cover. This prevents a change in bias stress on the transistor due to a change in atmospheric pressure. The stylus 50 extends through the hole 45 in the cover 40, and the tip 51 of the stylus contacts the surface of the transistor mounted on the top 11 of the transistor header 10. The epoxy material 70 which fills the portion of the hole 45 not occupied by the stylus 50 holds the stylus rigidly in place in the cover 40. A back 80 which is shown in dotted lines may be provided to protect the end of the stylus. The back 80 should also be provided with a hole (not shown) to permit atmospheric pressure equalization. The back 80 could be screwed on to a threaded portion 43 on the cover 40 if desired. The flexible cable 60 contains three wires 61 which lead from the base, emitter and collector terminals 12 on the bottom of transistor header 10. The cable leads through the diaphragm 20, the hole 42 in the cover 40 and out through the back 80, if provided. The hole 42 can be filled in with a material such as epoxy to prevent the pulling of the wires 61 away from the terminals 12 or the changing of the bias stress on the transistor.

Figure 3:
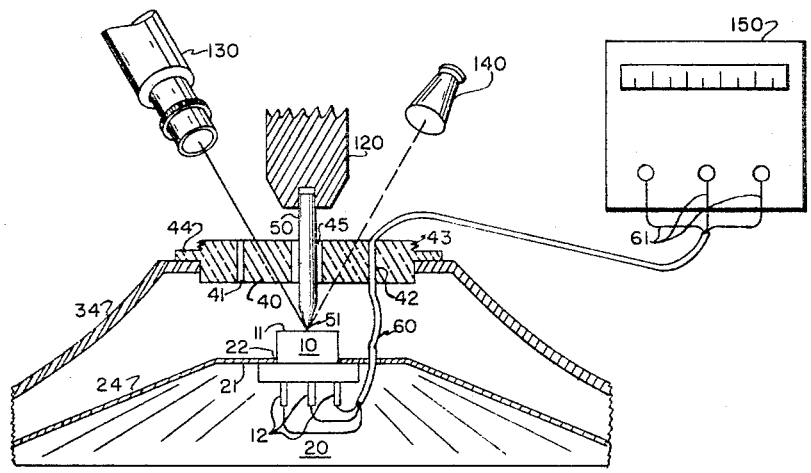
FIG. 3 is a partial view of the assembly which shows the manner of positioning the stylus.

FIG. 3 shows an enlarged view of the transducer assembly in the transmitter. To assemble the transducer, the transistor header 10 is first mounted in the diaphragm 20. The wires 61 are attached to the terminals 12 and the cable 60 is lead through the diaphragm 20. The transparent cover 40 is mounted over the end of the case and fastened in place with an epoxy at the rim 44. The cable 60 is inserted through the hole 42 and the wires 61 are attached to terminals on the instrument 150. The instrument 150 provides bias voltages for the base, emitter, and collector electrodes of the transistor and a reading of the desired output of the transistor. The end 52 of the stylus 50 is held in the chuck 120 of a micropositioning apparatus. The end 51 of the stylus 50 is inserted in the hole 45 in the transparent cover. The light source 140 shines through the transparent cover to illuminate the surface of the transistor, which is mounted on the top 11 of the header 10. The microscope 130 is used to view the surface of the transistor through the transparent cover 40. While viewing the surface of the transistor, the micropositioner is used to locate the tip of the stylus 50 at the proper point on the surface of the transistor. After the stylus is properly positioned, a bias force is applied thereto by the micropositioner to place a bias stress on the emitter-base junction of the transistor. This bias stress is of an amount which places the transducer in a highly sensitive region of its operating range. The instrument 150 can be used to indicate the amount of force being applied. The final step is to introduce a liquid epoxy material 70 into the hole 45 in the transparent cover 40. The epoxy is then permitted to harden while the micropositioner 120 maintains the position of the stylus and the force applied by it to the transistor. After the epoxy hardens, the stylus is held in place, as shown in FIG. 2, and the bias force on the transistor is retained also. The micropositioner can then be removed, and the assembly is complete.

The above is a detailed description of one embodiment of the invention and is not intended to limit the scope of the invention as claimed in the following claim.

What is claimed is:
1. A semiconductor transducer assembly comprising:
a hollow case having two open ends;
a diaphragm mounted over one of said open ends by its edge and having a flat center portion with a hole therethrough;
a transistor mounted in the hole in said diaphragm and having an emitter and a base region with a junction therebetween extending near a surface of said transistor, said surface facing the other open end of said case;
an apertured cover mounted on the other open end of said case;
a stylus extending into an aperture in said cover and into said case and having a tip portion positioned within said case so as to bear against said surface of said transistor,
said cover being of a transparent material to permit the viewing of said stylus tip and said transistor surface when said stylus is positioned within said case; and
means for rigidly maintaining the position of said stylus in said aperture and for maintaining said tip in contact with said surface.

References Cited
UNITED STATES PATENTS

| | | | |
|---|---|---|---|
| 2,530,745 | 11/1950 | Wallace | 179—110 |
| 3,277,698 | 10/1966 | Mason | 73—88.5 |
| 3,323,358 | 6/1967 | Fraioli | 73—141 |

WILLIAM C. COOPER, *Primary Examiner.*

ARTHUR A. McGILL, *Assistant Examiner.*

U.S. Cl. X.R.

317—235